US012597549B2

(12) United States Patent
Warnakulasuriya

(10) Patent No.: US 12,597,549 B2
(45) Date of Patent: Apr. 7, 2026

(54) THERMAL MANAGEMENT OF TRANSFORMER WINDINGS

(71) Applicant: Murata Manufacturing Co., Ltd., Nagaokakyo (JP)

(72) Inventor: Kapila Warnakulasuriya, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 657 days.

(21) Appl. No.: 18/119,731

(22) Filed: Mar. 9, 2023

(65) Prior Publication Data

US 2023/0207178 A1 Jun. 29, 2023

Related U.S. Application Data

(63) Continuation of application No. PCT/GB2021/051870, filed on Jul. 21, 2021.

(30) Foreign Application Priority Data

Jul. 22, 2020 (GB) ..................................... 2011332

(51) Int. Cl.

*H01F 27/22* (2006.01)
*H01F 27/02* (2006.01)
*H01F 27/28* (2006.01)
*H01F 27/32* (2006.01)

(52) U.S. Cl.

CPC ........... *H01F 27/22* (2013.01); *H01F 27/022* (2013.01); *H01F 27/289* (2013.01); *H01F 27/323* (2013.01)

(58) Field of Classification Search

CPC ...... H01F 27/22; H01F 27/022; H01F 27/289; H01F 27/323

See application file for complete search history.

(56) References Cited

U.S. PATENT DOCUMENTS

2011/0075368 A1* 3/2011 Stoev .................. H01F 27/2876 361/699
2018/0053593 A1* 2/2018 Kuo ......................... H01F 27/24
2021/0280366 A1* 9/2021 Yoon ....................... H01F 27/29

FOREIGN PATENT DOCUMENTS

DE 102011013684 A1 * 9/2012 ............. H01F 27/16
GB 2574481 A 12/2019
JP 2016129186 A * 7/2016

OTHER PUBLICATIONS

International Preliminary Report on Patentability, European Patent Office, Jan. 12, 2022 (Year: 2022).*
Official Communication issued in International Patent Application No. PCT/GB2021/051870, mailed on Oct. 27, 2021.

* cited by examiner

*Primary Examiner* — Malcolm Barnes
(74) *Attorney, Agent, or Firm* — Keating & Bennett, LLP

(57) ABSTRACT

A winding assembly for a transformer device includes a first and second coil with a plurality of windings, and a first set and a second set of thermally conductive plates. The first and second coils include a plurality of interleaved sets of turns. The plates of the first and second sets of the thermally conductive plates are interleaved with the sets of turns of the first and second coils respectively, and are disposed adjacent to one of the sets of turns of the first and second coils respectively, to transfer heat away from the coils. The first and second coils and the first and second sets of thermally conductive plates are encased in the resin dielectric material.

20 Claims, 14 Drawing Sheets

THERMAL MANAGEMENT OF TRANSFORMER WINDINGS

CROSS REFERENCE TO RELATED APPLICATIONS

This application claims the benefit of priority to United Kingdom Patent Application No. 2011332.0 filed on Jul. 22, 2020 and is a Continuation Application of PCT Application No. PCT/GB2021/051870 filed on Jul. 21, 2021. The entire contents of each application are hereby incorporated herein by reference.

BACKGROUND OF THE INVENTION

1. Field of the Invention

The present invention relates to a winding assembly of a transformer, a transformer device including the winding assembly, and thermal management of the transformer windings.

2. Description of the Related Art

In cast resin transformers, the windings are encased in a cast resin dielectric material. Cast resin is often used in the case of high voltage transformers where the isolation requirement between the input and the output circuits is high. The isolation requirements of such transformers usually range from several tens of kV to several hundreds of kV.

Cast resin transformers have many benefits over alternative systems such a liquid cooled transformers. Encasing the windings physically protects them, as well as removing the need for a coolant circulation system and the associated expense and complexity.

However, cast resin cannot typically be used to maintain the isolation requirement in high and medium frequency transformer windings. In such transformers, the loss densities are considerably high, which results in heat generation. The thick layers of cast resin material required to maintain the isolation requirement would create a barrier preventing heat flow from the windings. This would result in unacceptable build-up of heat in the windings, which could cause damage and ultimately failure of the transformer. Therefore, the cast resin method is usually only suitable for transformers with reasonably low winding loss densities, generating low levels of heat.

Instead, in high and medium frequency transformers, conventional paper insulation is typically used to maintain the isolation requirements. This has limited the level of isolation that can be achieved in high power high frequency (HPHF) transformers.

It is desirable to provide an improved thermal management system for transformer windings which allows use of a cast resin dielectric in high and medium frequency transformers, thus eliminating current limitations in the industry.

SUMMARY OF THE INVENTION

According to a first preferred embodiment of the present invention, a winding assembly for a transformer is provided. The winding assembly includes a first coil and a second coil, each including a plurality of sets of turns, wherein each set of turns includes one or more individual turns. The winding assembly further includes a first set and a second set of thermally conductive plates, and a resin dielectric material. The plurality of sets of turns of the first coil are interleaved with the plurality of sets of turns of the second coil. The first set of thermally conductive plates is interleaved with the sets of turns of the first coil, with each plate disposed adjacent to one of the sets of turns of the first coil, to transfer heat away from the first coil. The second set of thermally conductive plates is interleaved with the sets of turns of the second coil, with each plate disposed adjacent to one of the sets of turns of the second coil, to transfer heat away from the second coil. The first coil, the second coil, and the first and second sets of thermally conductive plates are encased in the cast resin dielectric material, to electrically insulate first coil and the second coil.

The preferred embodiments of the present invention facilitate efficient removal of heat generated in the windings without degrading the dielectric isolation strength between the input and output windings. This opens up the possibility of achieving very high isolation levels between the windings of high frequency transformers. The preferred embodiments of the present invention allow cast resin to be used to provide the insolation requirements in transformers where cast resin cannot typically be used due to thermal considerations. The thermally conductive plates allow heat to be removed from the windings while they are encased in the cast resin, preventing damage or failure due to overheating. Use of cast resin physically protects the windings, as well as removing the expense and complexity of a coolant circulation system.

In further preferred embodiments, the plates of the first set of thermally conductive plates may be disposed closer to the first coil than to the second coil along a coil winding axis, and the plates of the second set of thermally conductive plates may be disposed closer to the second coil than to the first coil along a coil winding axis.

The plates of each set of thermally conductive plates are positioned close to one of the coils in order to maximize removal of heat from the windings. The separation between each plate and the other winding provides space for the cast resin to fill in order to provide the required electrical isolation. Ensuring each plate is only positioned in direct proximity with one winding helps prevent the possibility of a short between the two windings through the thermally conductive plate.

Each plate of the first set of thermally conductive plates may include one or more elongate portions that are arranged to follow the turns of the first coil and may include one or more gap portions such that the plate does not form a complete turn. Each plate of the second set of thermally conductive plates may include one or more elongate portions that are arranged to follow the turns of the second coil and may include one or more gap portions such that the plate does not form a complete turn.

The elongate potions follow the turns of the coils in order to maximize the area of thermal contact between the thermally conductive plates and the respective coil in order to maximize extraction of heat from the windings. The one or more gap portions in the thermally conductive plates prevent each plate from forming a complete turn, which could lead to electrical shorting and cause failure of the device.

Each plate of the first and second sets of thermally conductive plates may be split into two sections electrically isolated from each other, with the gap portions separating the two sections. Again, this prevents the thermally conductive plates from acting like a shorted turn, which could damage the device due to high currents flowing in the thermally conductive plates.

The two electrically isolated sections of the thermally conductive plates may be symmetrical when viewed along the winding axis of the coil to which that thermally conductive plate is adjacent, and may each be arranged to follow a half turn of the coil. This is beneficial as each thermally conductive plate will transfer an equal share of the generated heat, preventing unnecessarily large thermal gradients.

The thermally conductive plate may be formed as a layer including one or more thermally conductive strip-like portions.

The first and second coils may be formed as a plurality of layers including one or more electrically conductive strip-like portions. The thermally conductive strip-like portions of the thermally conductive plates may at least partially overlap the electrically conductive strip-like portions of the first and second coils.

The strip like portions follow the path of the windings, in order to maximize the area of thermal contact between the plates and the respective coil, while minimizing proximity to other components, such as the other coil, which could lead to electrical shorting.

The thermally conductive strip-like portions may be arranged such that the thermally conductive plate is C-shaped or U-shaped.

The thermally conductive plate may be U-shaped or may include two U-shaped sections in the case of square windings. C-shaped thermally conductive plates may be used in the case of circular windings. The shape of the thermally conductive plates is such that they follow the turns of the windings, to maximize heat transfer from the windings to the thermally conductive plates.

The number of thermally conductive plates in the first set of thermally conductive plates may be equal to the number of sets of turns in the first coil, and each of the sets of turns in the first coil may have one adjacently disposed thermally conductive plate. The number of thermally conductive plates in the second set of thermally conductive plates may be equal to the number of sets of turns in the second coil, and each of the sets of turns in the second coil may have one adjacently disposed thermally conductive plate.

A one-to-one mapping between the thermally conductive plates and the sets of turns of the first and second coils means heat can be removed from each set of turns of each coil, preventing any given set of turns from overheating.

Each plate of the first and second sets of thermally conductive plates may be thermally connected to a cooling structure. The plates of the first set of thermally conductive plates may be thermally connected to a different cooling structure than the plates of the second set of thermally conductive plates, to prevent electrical contact between the two sets of thermally conductive plates.

The cooling structure aids removal of heat from the windings. Having a different cooling structure for each set of thermally conductive plates means that the first and second set of thermally conductive plates are not in electrical contact with each other via the cooling structure, reducing the risk of an electrical short between the two coils via the thermally conductive plates and cooling structure.

Each plate of the first and second sets of thermally conductive plates may be thermally connected to a cooling structure. The plates of the first set of thermally conductive plates may be thermally connected to a different cooling structure than the plates of the second set of thermally conductive plates to prevent electrical contact between the two sets of thermally conductive plates. The two sections of each thermally conductive plate may be thermally connected to different cooling structures to prevent electrical connection between the two sections of a given thermally conductive plate.

Having a different cooling structure for each set of thermally conductive plates and a different cooling structure for each of the two sections of each thermally conductive plate, in other words, a minimum of four cooling structure, reduces the risk of electrical shorting. This arrangement means that electrical contact via the cooling structure is prevented between the two sets of thermally conductive plates, reducing the risk of shorting between the two coils via the thermally conductive plates and cooling structure. Furthermore, electrical contact via the cooling structure between the two sections of a given thermally conductive plate is prevented, preventing the two sections of a thermally conductive plate being connected to form a complete turn.

The cooling structure may be radiating elements that are located outside of the resin dielectric material, and may be attached to the thermally conductive plates via connection portions which extend outside the encasing resin dielectric material.

Radiating elements mounted on the outside of the cast resin dielectric material allow the heat transferred to the thermally conductive plates from the windings to be removed via radiation and convention. Thus, a cast resin dielectric can be used to provide the isolation requirements without causing overheating in devices with high loss densities. The preferred embodiments of the present invention allow the required distance of insulation to be maintained all the way out to the radiation surfaces. Therefore, it is possible to extract the heat out of the windings without degrading the isolation properties of the transformer. An airflow over the radiating elements could be used to increase removal of heat.

The plurality of sets of turns of both the first and second coil may have first and second diameters. The first diameter may be larger than the second diameter. Each of the first set of thermally conductive plates may be disposed adjacent to the sets of turns of the first coil which have the first diameter, and each of the second set of thermally conductive plates may be disposed adjacent to the sets of turns of the second coil which have the first diameter.

Such winding arrangements may be used to mitigate high frequency losses due to the proximity effect. Murata Manufacturing Corporation's 'pdqb' type windings are one such arrangement, as detailed in UK patent publication GB2574481, the entire contents of which are incorporated herein by reference.

The sets of turns of the first coil may alternate between having the first diameter and the second diameter, and the sets of turns of the second coil may alternate between having the second diameter and the first diameter.

This winding arrangement provides high mitigation of high frequency losses due to the proximity effect.

The number of thermally conductive plates in the first set of thermally conductive plates may be equal to the number of sets of turns in the first coil with the first diameter, and each of the sets of turns in the first coil with the first diameter may have one adjacently disposed thermally conductive plate. The number of thermally conductive plates in the second set of thermally conductive plates may be equal to the number of sets of turns in the second coil with the first diameter, and each of the sets of turns in the second coil with the first diameter may have one adjacently disposed thermally conductive plate.

A one-to-one mapping between the thermally conductive plates and the sets of turns of the first and second coils with the larger diameter means heat can be removed from each set of turns of each coil, preventing any given set of turns from overheating.

The interconnections in the first coil between the sets of turns with the first diameter and the sets of turns with the second diameter may fit around the thermally conductive plates, and the interconnections in the second coil between the sets of turns with the first diameter and the sets of turns with the second diameter may fit around the thermally conductive plates.

The plurality of sets of turns of the first and second coils may be square shaped, and each thermally conductive plate of the first and second sets of thermally conductive plates may be U-shaped so as to follow the turns of the respective coil.

Square shaped coils allow the device to be more compact. The U-shaped thermally conductive plates follow the turns of the square shaped coils to maximize the area of thermal contact between the thermally conductive plates and the windings.

The first coil, the second coil, and the first and the second sets of thermally conductive plates may be stacked in a laminar configuration. The first and the second coils may share a common winding axis. The laminar configuration allows the device to be more compact and easier to manufacture.

The first set of thermally conductive plates and the second set of thermally conductive plates may be electrically isolated from each other. This can reduce the risk of electrical shorting between the two coils via the two sets of thermally conductive plates.

The first and second coils each include input and output terminals which may extend out of the resin dielectric material so that an electrical can be input and output from the device.

At least one of the thermally conductive plates may be made of aluminium or copper. Such materials have high thermal conductivities to increase the heat removed from the windings, while also being non-magnetic so as to not disrupt the magnetic properties of the device.

According to a second preferred embodiment of the present invention, a transformer device is provided. The transformer device includes a transformer core and the winding assembly of the first preferred embodiment of the present invention.

The preferred embodiments of the present invention can be applied to any transformer windings where both the input and output windings are in a single cast resin unit, with the cast resin providing isolation between the windings. This includes, but is not limited to, HPHF transformers and Murata Corporation's pdqb type transformer windings.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

This application relates to thermal management of transformer windings. In particular, a winding assembly for a transformer device is disclosed. The winding assembly includes first and second coils with a plurality of windings, and a first set and a second set of thermally conductive plates. The first and second coils include a plurality of interleaved sets of turns. The plates of the first and second sets of the thermally conductive plates are interleaved with the sets of turns of the first and second coils respectively, and are disposed adjacent to one of the sets of turns of the first and second coils, respectively, to transfer heat away from the first and the second coils. The first and second coils and the first and second sets of thermally conductive plates are encased in the resin dielectric material.

Figure 1:
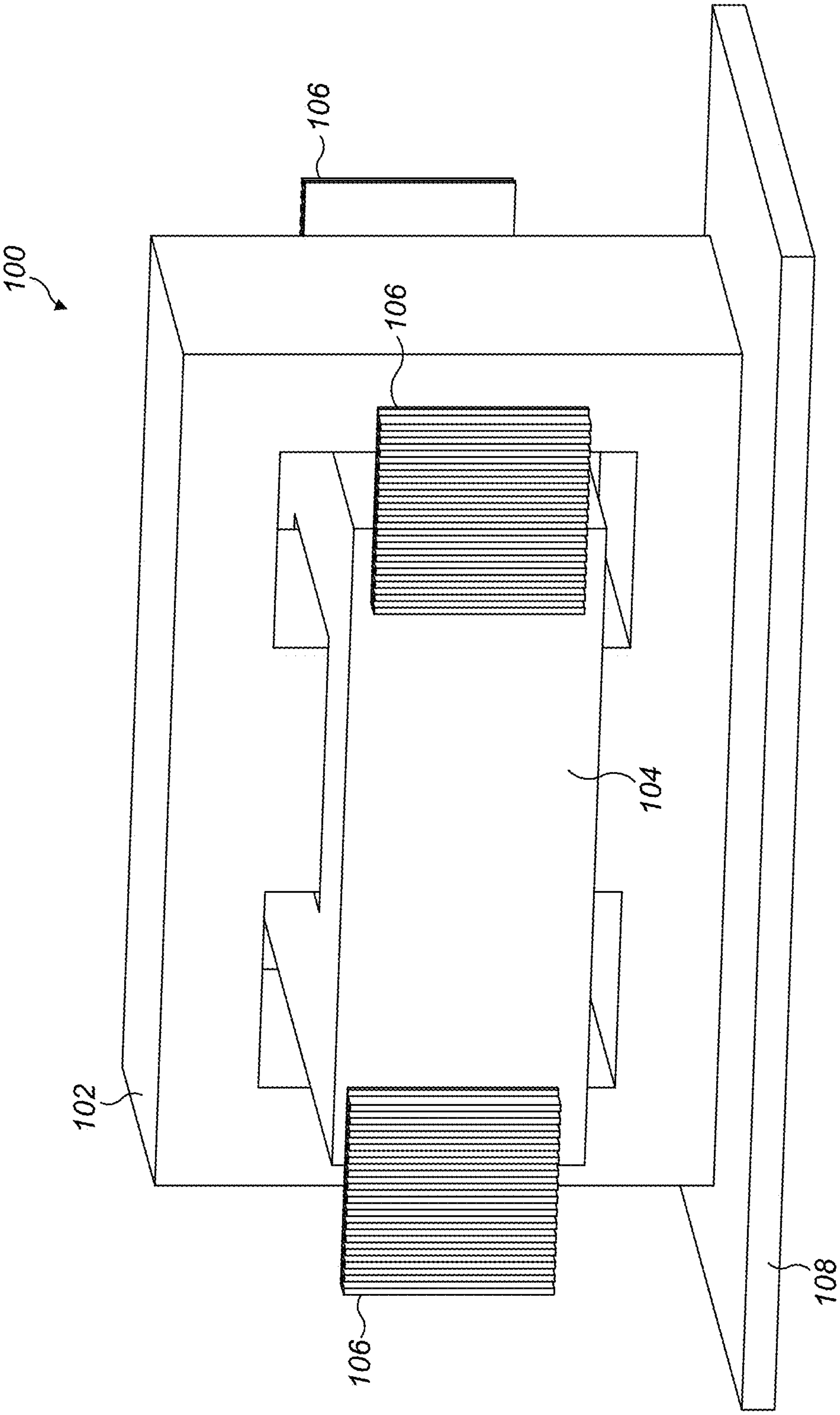
FIG. 1 shows an example of a transformer device of a preferred embodiment of the present invention.

FIG. 1 shows an example of a transformer device of a preferred embodiment of the present invention. The transformer device 100 includes a transformer core 102, a winding assembly 104, and radiating elements 106 and may include a base 108. The transformer device 100 can be a high frequency transformer, a medium frequency transformer, a high voltage transformer, a HPHF transformer, or the like. A single phase shell type transformer is shown in FIG. 1 and throughout this specification; however, preferred embodiments of the present invention could also be applied in core type transformers and multiphase transformers.

The transformer core 102 of FIG. 1 is constructed from twelve E-shaped cores. However various examples of types of core known to the skilled person could be used. For example, the number of E-shaped cores used can vary depending on the application. Typically, a larger number of cores are used in higher power applications. Alternatively, EI type cores could be used to form the transformer core 102, or one or more pairs of U-shaped or UI-shaped cores could be used. The transformer core 102 is made from a magnetic material such as a ferrite material.

Figure 2:
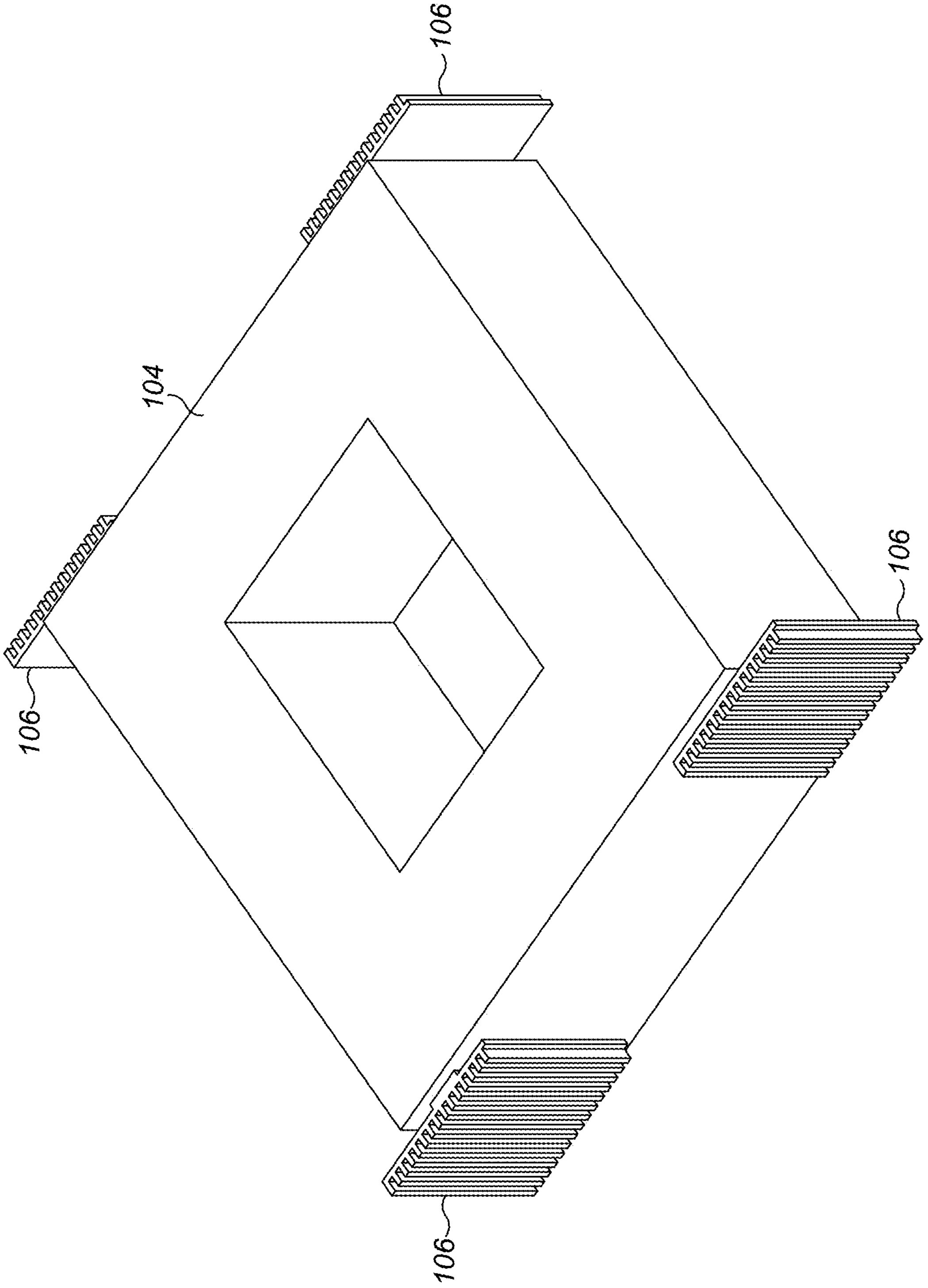
FIG. 2 shows the winding assembly of the transformer device of FIG. 1.

FIG. 2 shows the winding assembly 104 and attached radiating elements 106 in isolation. The interior structure of the winding assembly 104 will be discussed in more detail below. In this preferred embodiment, the winding assembly 104 is square or substantially square within manufacturing and/or measurement tolerances with a central opening to allow the transformer core 102 to pass through the winding assembly. The winding assembly 104 includes four radiating elements 106 attached to its periphery. The radiating elements 106 act as a cooling structure. The radiating elements 106 are thermally connected to the internal thermally conductive plates, which will be discussed in detail below, to allow heat to transfer out of the interior of the winding assembly. The number of radiating elements 106 can vary depending on the application and arrangement of the windings inside the winding assembly 104. The radiating elements 106 of FIG. 2 are metal components, e.g., aluminum or copper, which have an increased surface area through the radiating fins to help increase heat transfer. The radiating elements 106 can be cooled by an airflow over the surface of the radiating fins, or the like.

Figure 3:
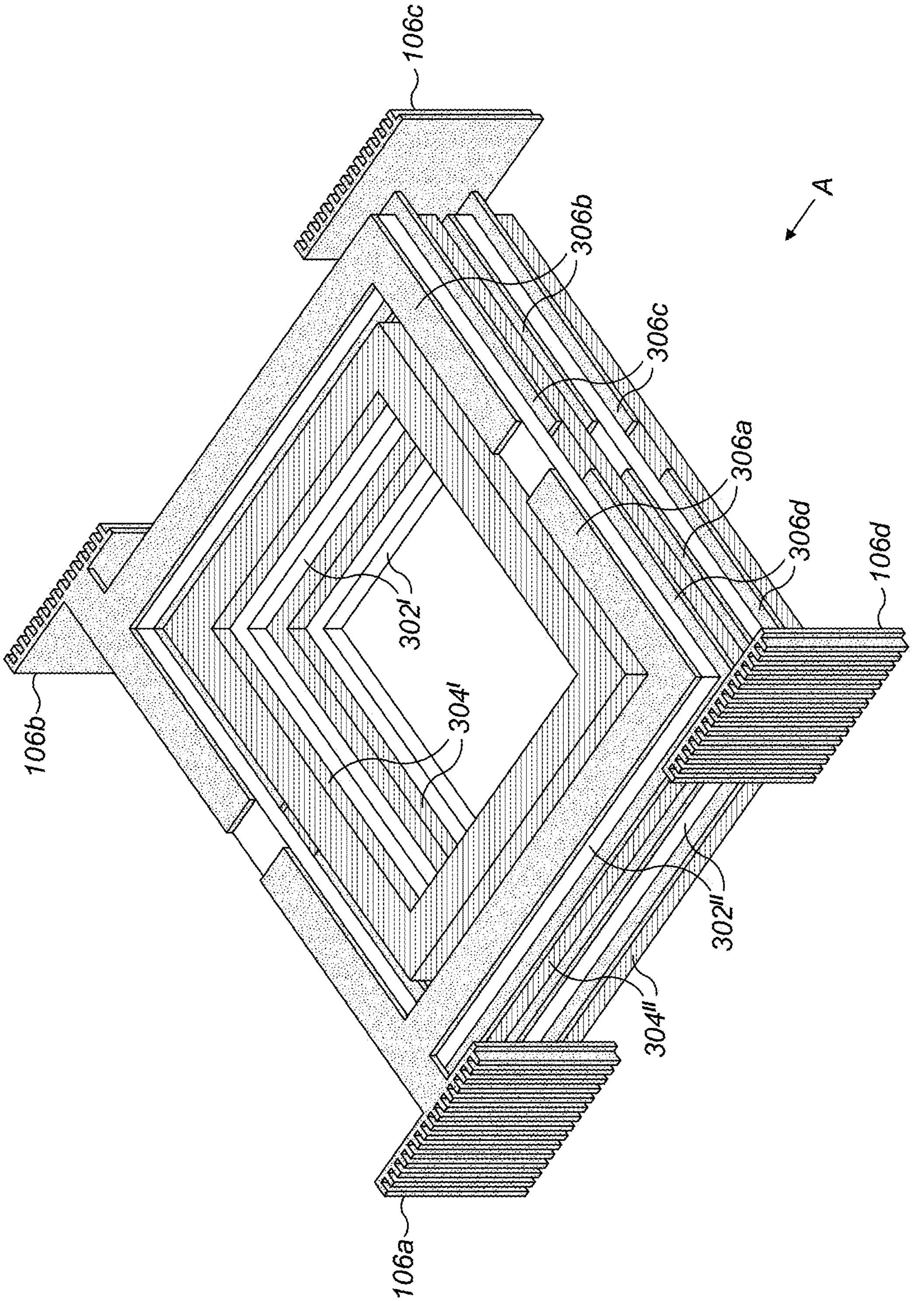
FIG. 3 shows the winding assembly of FIG. 2 with the cast resin removed.
Figure 4:
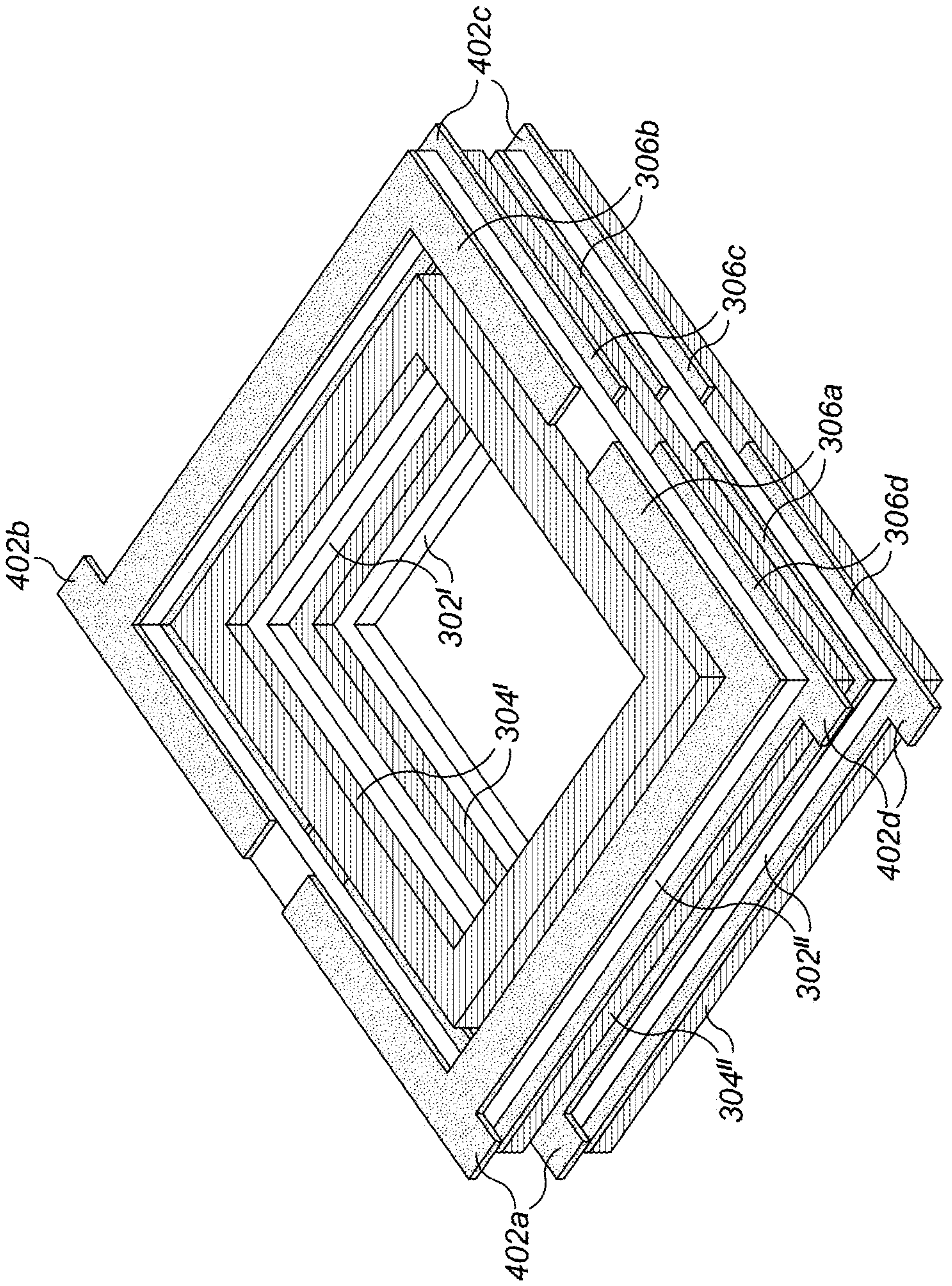
FIG. 4 shows the winding assembly of FIG. 2 with the cast resin and radiating elements removed.

FIG. 3 shows the same components as in FIG. 2. However in FIG. 3 the cast resin dielectric of the winding assembly 104 has been removed to reveal the internal structure of the winding assembly 104. FIG. 4 is the same as FIG. 3, except that the radiating elements 106 have also been removed in FIG. 4. The internal structure of the winding assembly 104 includes a first coil or winding 302 including a plurality of turns, a second coil or winding 304 including a plurality of turns, and a plurality of thermally conductive plates 306. These three groups of components are distinguished by the three different shadings in FIGS. 3 and 4. The first and second coils may be the primary and secondary coils of the transformer device 100, for example. Before discussing the function of the plurality of thermally conductive plates 306, a detailed discussion of windings to which preferred embodiments of the invention can be applied follows.

In the preferred embodiment of FIGS. 3 and 4, each of the first coil 302 and the second coil 304 includes four sets of turns, two inner sets of turns 302', 304' and two outer sets of turns 302", 304". Each set of turns may include one or more individual turns (not shown in FIGS. 3 and 4). The outer sets of turns 302", 304" of both the first coil 302 and second coil 304 have a first diameter, and the inner sets of turns 302', 304' of both the first coil 302 and second coil 304 have a second diameter. The first diameter is larger than the second diameter. The sets of turns of the first coil 302 are interleaved with the sets of turns of the second coil 304. The sets of turns of a given coil are connected to create a continuous winding. Each of the first and second coil 302, 304 alternate between the inner and outer sets of turns as the winding of each coil is traversed. In other words, the sets of turns of the first coil 302 alternate between having the first diameter and the second diameter, and the sets of turns of the second coil 304 alternate between having the second diameter and the first diameter. This winding configuration is an example of Murata's pdqb windings, as detailed in UK patent publication GB2574481, the entire contents of which are incorporated herein by reference. Such winding arrangements may be used to mitigate high frequency losses due to the proximity effect. The details of the interconnections between each set of turns has been omitted from FIGS. 3 and 4 for simplicity, and therefore the windings of FIGS. 3 and 4 appear as two concentric sets of squares. However this depiction is intended to simplify the diagrams, and it is to be understood by the skilled person that the windings are in fact continuous so as to form two coils. The interconnections will be discussed in detail in FIGS. 5 to 10.

Figure 5:
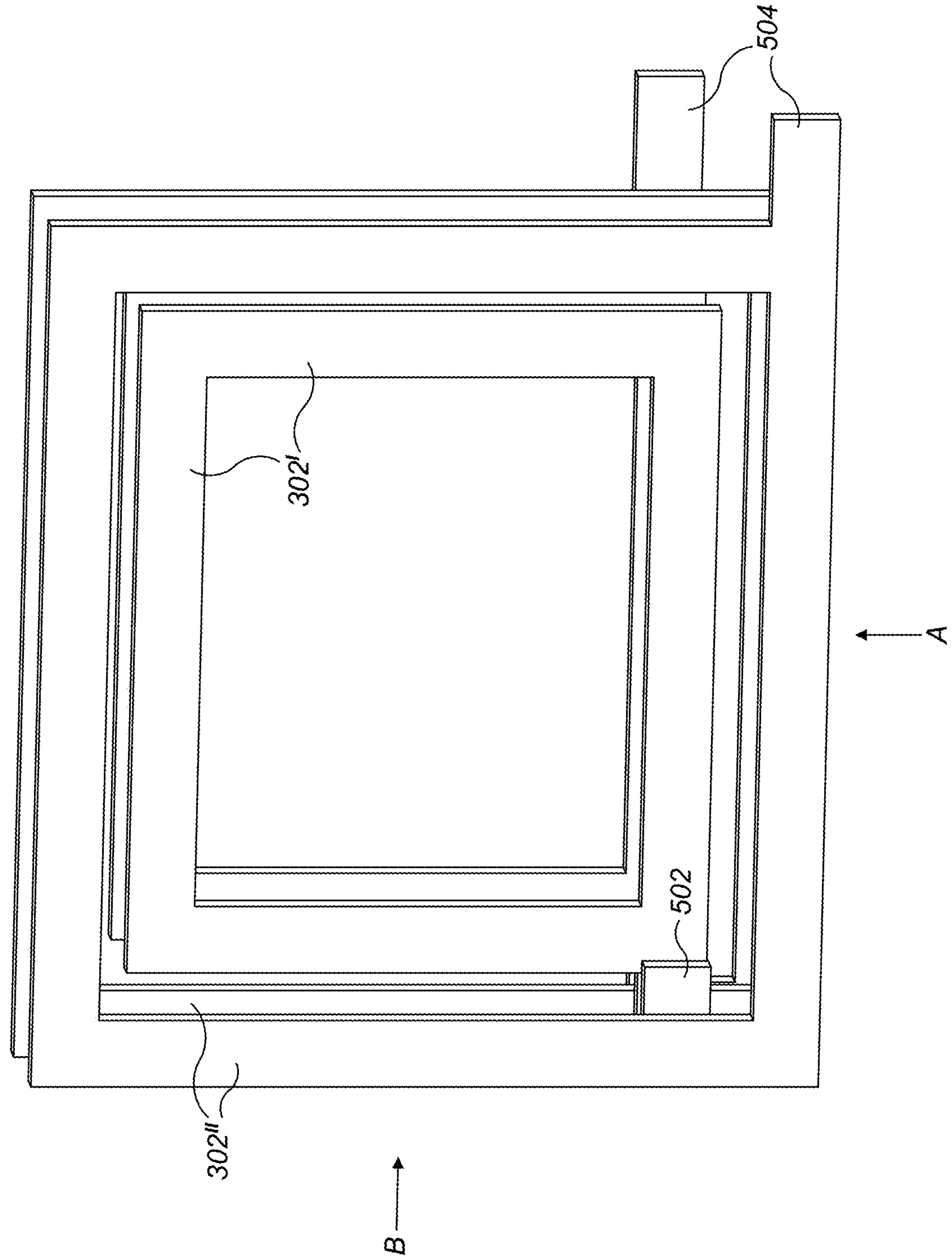
FIG. 5 shows an example first coil of a preferred embodiment of the present invention.
Figure 6:
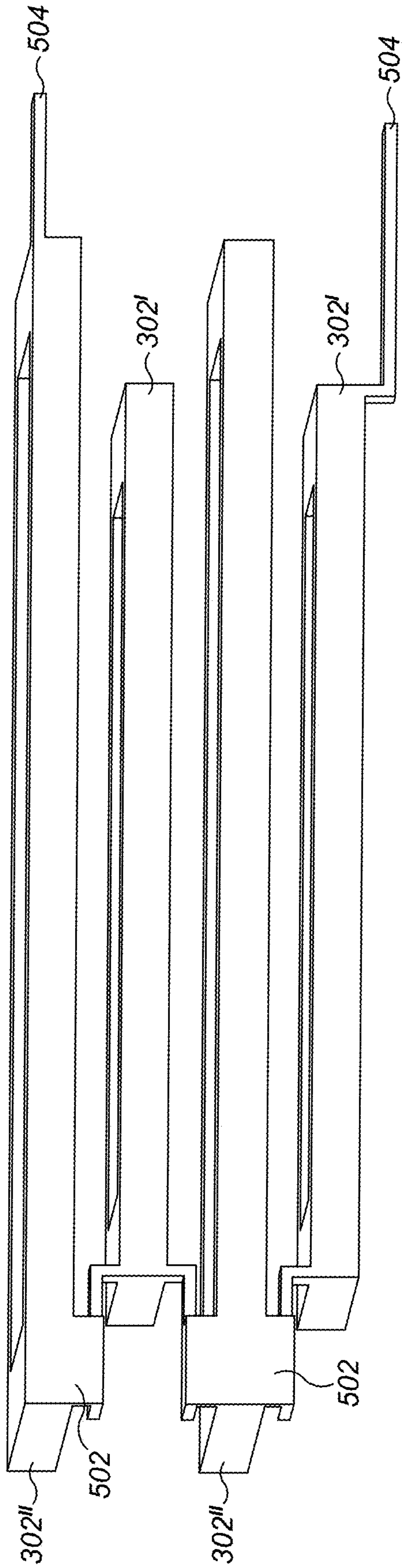
FIG. 6 shows a side view of the first coil of FIG. 5.
Figure 7:
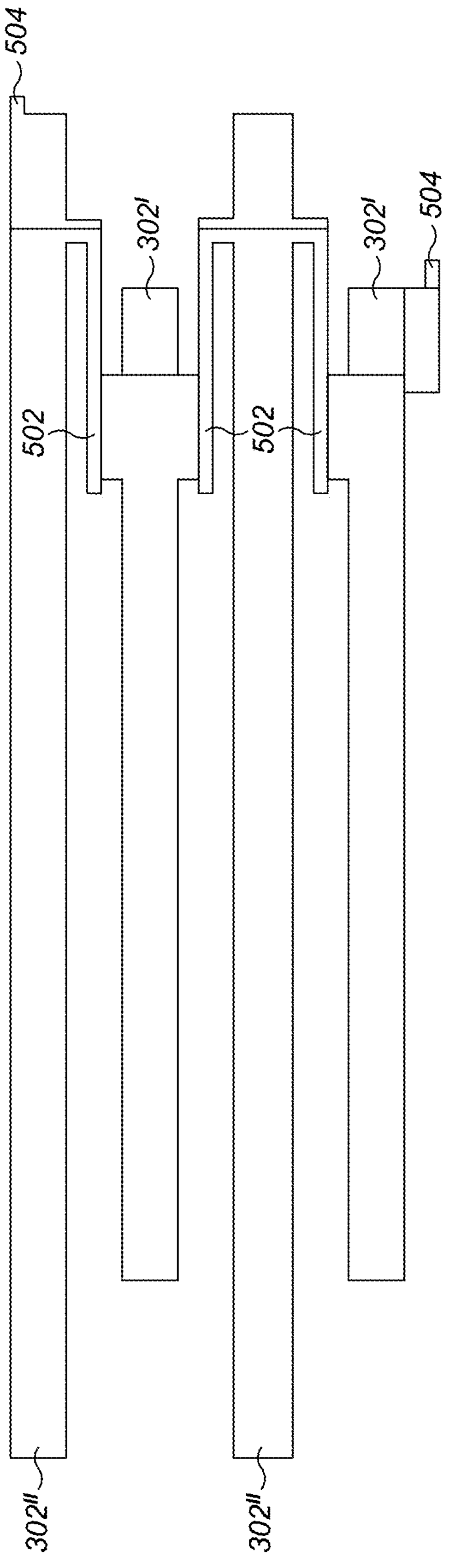
FIG. 7 shows a side view of the first coil of FIG. 5.
Figure 8:
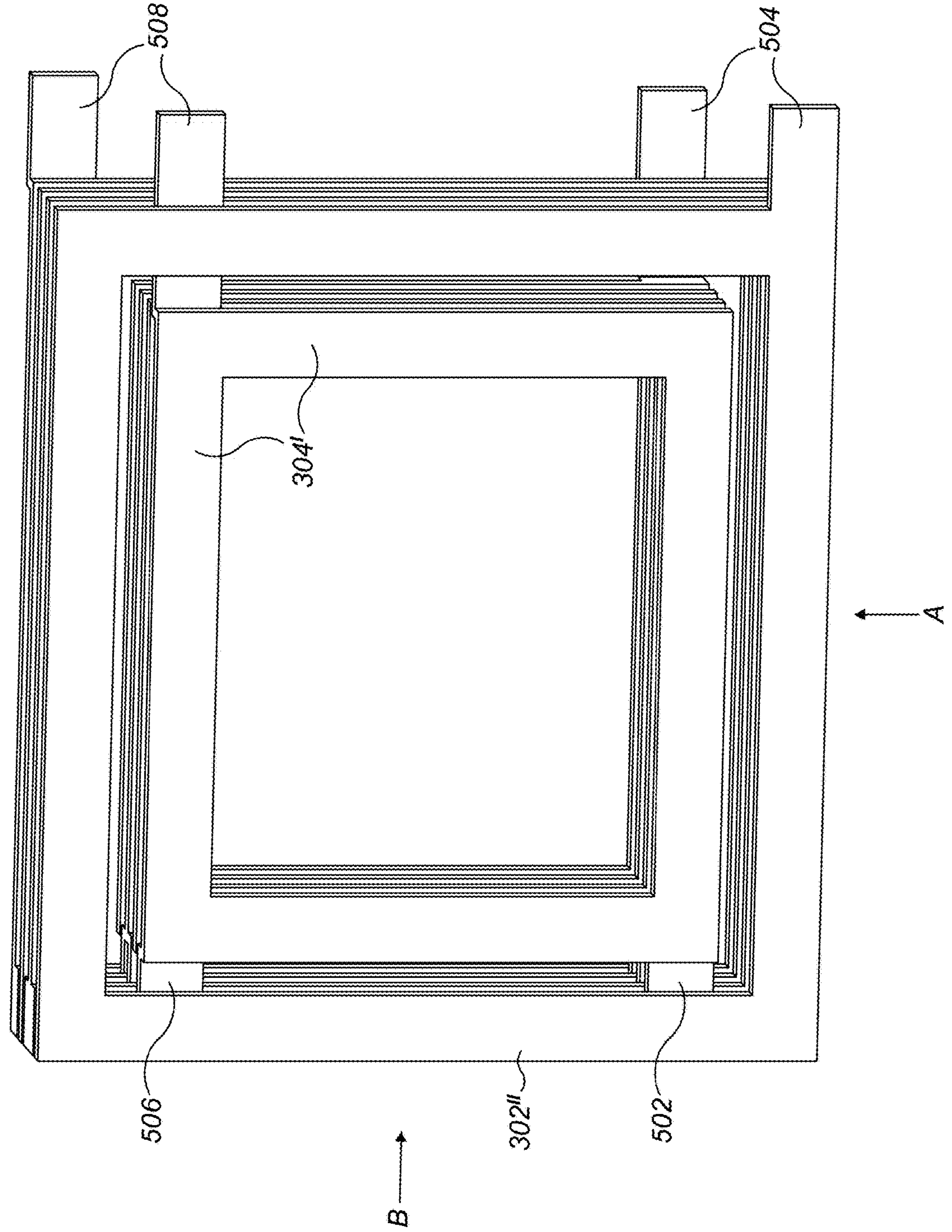
FIG. 8 shows the first coil of FIG. 5 in combination with an example second coil of a preferred embodiment of the present invention.
Figure 9:
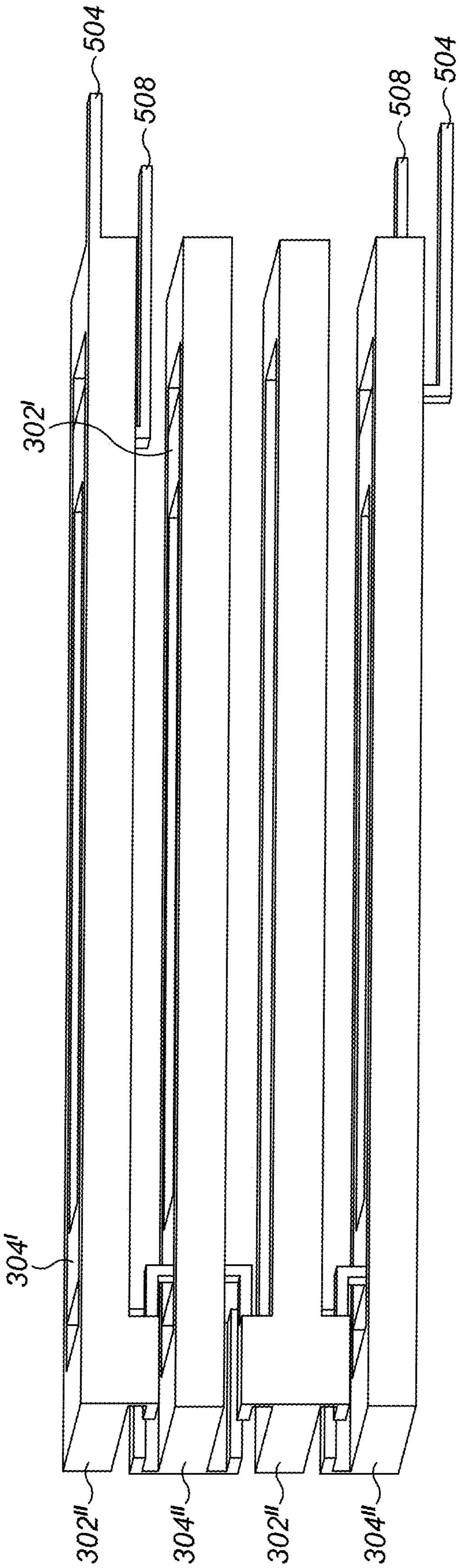
FIG. 9 shows a side view of the second coil of FIG. 8.
Figure 10:
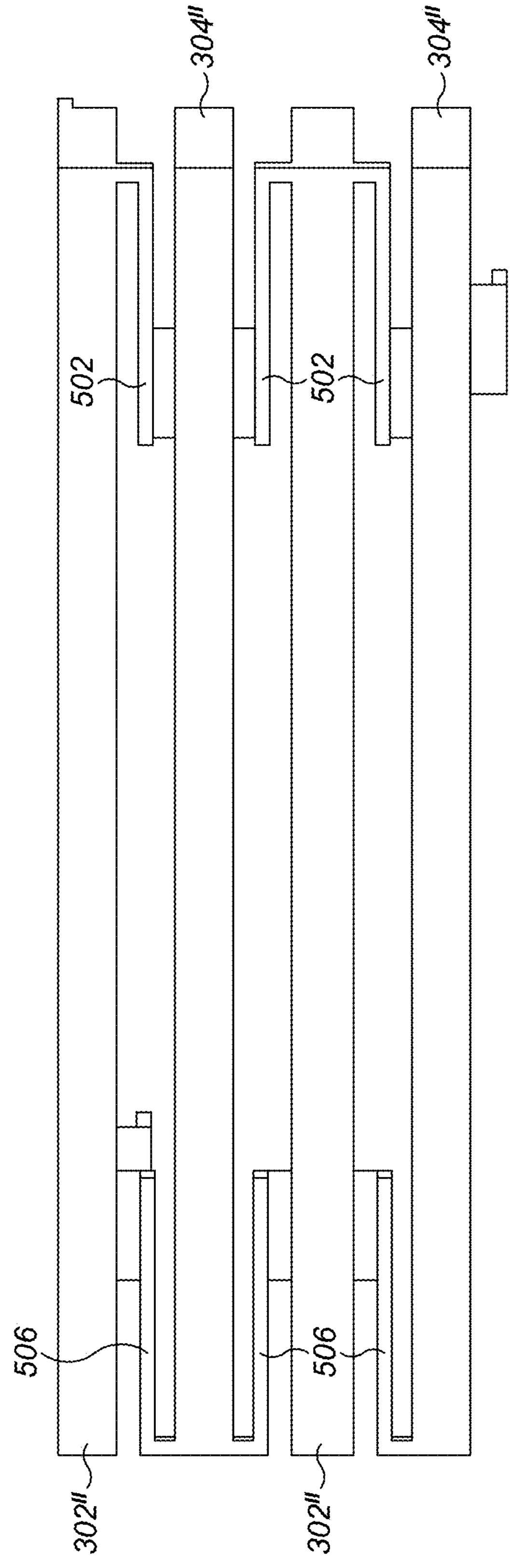
FIG. 10 shows a side view of the second coil of FIG. 8.

FIGS. 5 to 10 show the windings of FIGS. 3 and 4 with an example of an exact configuration of the interconnections between the sets of turns. FIG. 5 shows the first coil alone. FIG. 6 shows a side view of the first coil, from the direction marked A in FIG. 5. FIG. 7 shows a side view of the first coil, from the direction marked B in FIG. 5. FIGS. 8, 9, and 10 shows the same views as FIGS. 5, 6, and 7 respectively, but with both the first coil and second coil included, with the first coil and second coil interleaved together.

As can be seen in FIGS. 5 to 7, the inner sets of turns 302' and outer sets of turns 302" of the first coil 302 are connected though the interconnections 502 to form a continuous winding. The first coil 302 includes input and output terminals 504 at either end of the first coil 302. In the example of FIGS. 5 to 7, the windings are square shaped, and the interconnections 502 are all positioned at one corner of the square.

FIGS. 8 to 10 show both the first coil 302 and second coil 304 in combination. The second coil includes interconnections 506 between the inner set of turns 304' and the outer set of turns 304", and includes input and output terminals 508 at either end of the second coil 304. The second coil 304 is identical to the first coil 302. When the coils are combined the second coil 304 is rotated by 180° and the windings are arranged in an interleaved fashion, with each of the outer set of turns of the coils positioned adjacent to a corresponding inner set of turns of the other coil. The first and second coils 302, 304 may share a common winding axis.

The windings pictured in FIGS. 5 to 10 are an example of Murata's pdqb type windings. The winding arrangement of FIGS. 5 to 10 with two inner sets of turns and two outer sets of turns in each of the first and second coils 302, 304 provides high mitigation of high frequency losses due to the proximity effect. However, it is to be understood that the windings used in FIGS. 3 and 4, and shown in full detail in FIGS. 5 to 10, are for exemplary purposes only. The preferred embodiments of the present invention could be applied to various different winding arrangements, as would be understood by the skilled person.

For example, the windings could include a first and second coil with any number of inner and outer sets of turns. The windings could switch between the inner and outer sets any number of times. For example, in one preferred embodiment each of the first and second coil 302, 304 may each include only one inner set of turns and one outer set of turns. Alternatively, a plurality of inner sets of turns and outer sets of turns could be used in each coil, with multiple switches between the inner sets of turns and outer sets of turns as each of the coils is traversed.

The windings may also differ in shape. For example, a circular arrangement could be used for the first and second coils 302, 304, rather than the square arrangement of FIGS. 5 to 10. The interconnections between the sets of turns could be located at various positions around the turns of the coils. Flat wires such as in FIGS. 5 to 10 could be used, or alternatively round wires or the like could be used. Flat wire disk type windings such as Murata's pdqb windings can be used because flat wires have an increased contact area with the thermally conductive plates, allowing more heat to be removed via the thermally conductive plates.

Alternatively, winding arrangements other than pdqb windings could be used. For example, a winding arrangement with helical first and second coils could be used. The helical first and second coils may each include a plurality of sets of turns, containing one or more individual turns. The sets of turns of the first and second coils can be interleaved in a double helix type structure, with interconnections between each of the sets of turns in a given coil. Such a preferred embodiment would not include an inner set of turns. Instead, the sets of turns of the helical coils would take the place of each of the outer set of turns.

Various other winding arrangements could be conceived. Any winding arrangement with interleaved first and second coils that are isolated from each other via cast resin could be used. The first coil and second coil of the winding assembly may be stacked in a laminar configuration. A laminar configuration allows the device to be more compact and easier to manufacture. Whichever winding arrangement is used, each coil may include just one of the sets of thermally conductive plates disposed adjacent to it, as will be discussed below.

The wires in the windings may be a metallic wire such as a copper wire. The wires may be round wire windings or flat wire windings. The wires are insulated to prevent any electrical signal flowing into or through the thermally conductive plates. This can be achieved through various structures or arrangements such as coating the wires, Kapton® tape, or the like.

Returning to FIGS. 3 and 4, the plurality of thermally conductive plates 306 are split into a first set of thermally conductive plates 306*a*, 306*b* and a second set of thermally conductive plates 306*c*, 306*d*. The first set of thermally conductive plates 306*a*, 306*b* is interleaved with the sets of turns of the first coil 302, with each plate disposed adjacent to one of the sets of turns of the first coil 302. The second set of thermally conductive plates 306*c*, 306*d* is interleaved with the sets of turns of the second coil 304, with each plate disposed adjacent to one of the sets of turns of the second coil 304. The thermally conductive plates 306 are made of a material with a high thermal conductivity that will not disrupt the magnetic properties of the transformer, for example a non-magnetic metal could be used, such as aluminum of copper. The thermally conductive plates 306 are thermally connected to a cooling structure such as the radiating elements 106. The thermally conductive plates 306 transfer heat away from the first and second coils 302, 304 via conduction, and transfer the heat to the radiating elements 106 via the connection portions 402. The heat can be removed from the winding assembly 104 via radiation or convection from the radiating elements 106. Although plates are used in this preferred embodiment, alternatives such as rods or the like could be used.

In the preferred embodiment of FIGS. 3 and 4, the thermally conductive plates 306 are placed adjacent to the outer sets of turns 302", 304" of both the first coil 302 and second coil 304. Therefore, each of the first set of thermally conductive plates 306*a*, 306*b* is disposed adjacent to the sets of turns 302" of the first coil which have the first diameter, and each of the second set of thermally conductive plates 306*c*, 306*d* is disposed adjacent to the sets of turns 304" of the second coil 304 which have the first diameter. In some preferred embodiments, the thermally conductive plates may be placed adjacent to the inner sets of turns 302', 304' instead of, or in addition to, the outer sets of turns 302", 304". However, positioning the thermally conductive plates adjacent to the outer sets of turns 302", 304" alone simplifies the construction. Moreover, a construction with thermally conductive plates adjacent to only the outer set of turns provides a sufficient structure for heat flow, as the inner and outer sets of turns are connected and therefore some heat transfer is possible between the inner and outer sets of turns.

In the preferred embodiment of FIGS. 3 and 4, the thermally conductive plates 306 substantially follow the path of the outer set of turns of the respective winding. In other words, each plate of the first set of thermally conductive plates 306*a*, 306*b* includes one or more elongate portions that are arranged to follow the turns of the first coil 302, and each plate of the second set of thermally conductive plates 306*c*, 306*d* includes one or more elongate portions that are arranged to follow the turns of the second coil 304. The elongate potions follow the turns of the coils in order to maximize the area of thermal contact between the thermally conductive plates and the respective coil, in order to maximize extraction of heat from the windings.

In this preferred embodiment, each plate of the first and second sets of thermally conductive plates is split into two sections electrically isolated from each other, with gap portions separating the two sections. Each plate of the first set of thermally conductive plates 306*a*, 306*b* is partitioned into a first section 306*a* and a second section 306*b*. Each plate of the second set of thermally conductive plates 306*c*, 306*d* is similarly partitioned into a first section 306*c* and a second section 306*d*. In this preferred embodiment, the two sections of each thermally conductive plate are symmetrical about the windings axis of the coil to which that thermally conductive plate is adjacent. The first and second sections of each plate are electrically isolated from each other due to the gap portions, as will be discussed further with respect to FIG. 11.

The first and second sections of each thermally conductive plate may be positioned on opposing sides of the outer set of turns 302", 304" of the first or second coil 302, 304. For example, when the winding arrangement shown in FIGS. 5 to 10 is used, the first sections 306*a* of the first set of thermally conductive plates are positioned on the side of the first coil 302 including the interconnections 502, and the second sections 306*b* of the first set of thermally conductive plates are positioned on the side of the first coil 302 including the input and output terminals 504. The first sections 306*c* of the second set of thermally conductive plates are positioned on the side of the second coil 304 including the input and output terminals 508, and the second sections 306*d* of the second set of thermally conductive plates are positioned on the side of the second coil 304 including the interconnections 506. In other words direction A in FIG. 8 corresponds to direction A in FIG. 3. The interconnections of each of the coils are shaped so as to fit around the thermally conductive plates and the outer set of turns of the other coil. Alternatively, the thermally conductive plates may contain cut out sections to accommodate the interconnections between the sets of turns.

In the preferred embodiment of FIGS. 3 and 4 the first coil 302, the second coil 304, and the first and the second sets of thermally conductive plates 306 are stacked in a laminar configuration. The thermally conductive plates 306 are formed as layers including one or more thermally conductive strip-like portions and the first coil 302 and second coil 304 are formed as a plurality of layers including one or more electrically conductive strip-like portions. When viewed along the winding axis of the first coil 302, the thermally conductive strip-like portions of the first set of thermally conductive plates 306*a*, 306*b* at least partially overlap the electrically conductive strip-like portions of the first and second coils. Similarly, when viewed along the winding axis of the second coil 304, the thermally conductive strip-like portions of the second set of thermally conductive plates 306*c*, 306*d* at least partially overlap the electrically conductive strip-like portions of the first and second coils 302, 304. When the contours of the thermally conductive plates overlap exactly with the contours of the first and second coils 302, 304, the area of thermal contact is maximized, leading to increased removal of heat from the windings.

In the present preferred embodiment, square shaped coils are used, and therefore the strip-like portions of the thermally conductive plates 306 have a U-shaped construction so as to follow the turns of the respective coil and overlap the coil when viewed along the coil winding axis. If a circular winding arrangement was used with circular first and second coils, the thermally conductive plates 306 would have a C-shaped construction in order to overlap with the coil. The strip like portions follow the path of the windings so as to maximize the area of thermal contact between the plates and the respective coil, while minimizing proximity to other components, such as the other coil, which could lead to electrical shorting.

Figure 11:
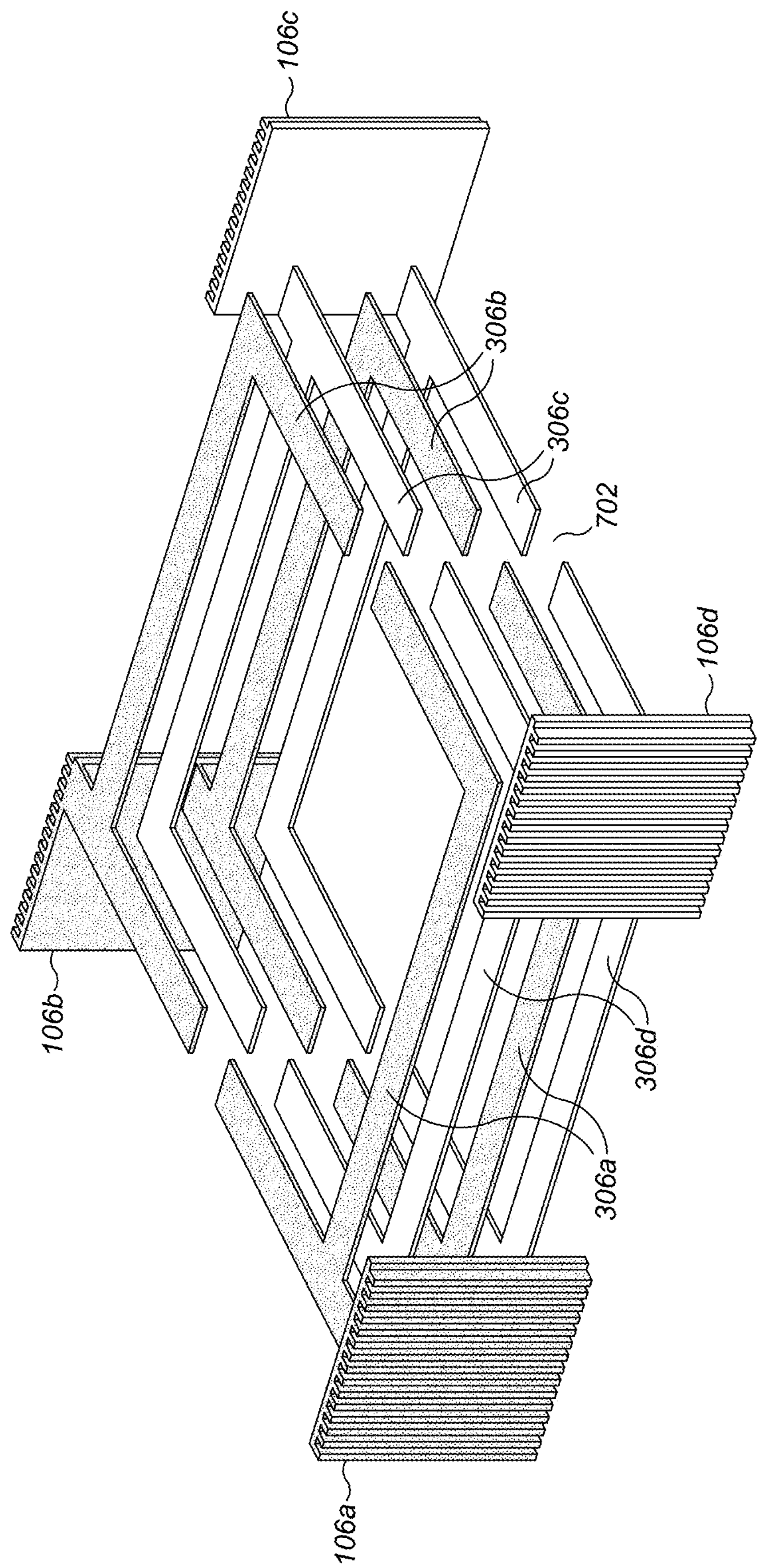
FIG. 11 shows an arrangement of the thermally conductive plates in a preferred embodiment of the present invention.

FIG. 11 shows the arrangement of the thermally conductive plates 306 from the preferred embodiment of FIG. 3 in isolation. The first set of thermally conductive plates 306*a*, 306*b* which are placed adjacent to the first coil 302 are shaded in FIG. 11, and the second set of thermally conductive plates 306*c*, 306*d* which are placed adjacent to the second coil 304 are not shaded. The plates of the first set of thermally conductive plates 306*a*, 306*b* are thermally connected to a different cooling structure than the plates of the second set of thermally conductive plates 306*c*, 306*d* to prevent electrical contact between the two sets of thermally conductive plates. In other words, the first set of thermally conductive plates 306*a*, 306*b* is connected to a first set of radiating elements 106*a*, 106*b*, and the second set of thermally conductive plates 306*c*, 306*d* is connected to a second set of radiating elements 106*c*, 106*d* so that the first set of thermally conductive plates and second set of thermally conductive plates are electrically isolated from each other.

Ensuring that each of the first set 306*a*, 306*b* and second set 306*c*,3 06*d* of thermally conductive plates are electrically isolated from each other helps prevent any electrical shorting from occurring between the first coil and the second coil. Each radiating element is only connected to thermally conductive plates in either the first set or the second set of thermally conductive plates, corresponding to only one of either the first coil or the second coil. Therefore, the separation of the first and second sets of thermally conductive plates is maintained all the way out to the radiating surfaces, as shown by the shading in FIG. 11. This reduces any possibility of shorting between the first coil and second coil in the case that the insulation of the wires in one of the coils fails, resulting in electrical contact with the thermally conductive plates adjacent to that coil.

Furthermore, in the present preferred embodiment, each thermally conductive plate is separated by the gap portions 702 into two sections, labelled by numerals 306*a* to 306*d* in FIG. 11. As well as the first and second set of thermally conductive plates being connected to different cooling structures, the two sections of each thermally conductive plate are thermally connected to different cooling structures to prevent electrical connection between the two sections of a given thermally conductive plate. In other words, the first sections 306*a* of the first set of thermally conductive plates are thermally connected to a first radiating element 106*a* only, and the second sections 306*b* of the first set of thermally conductive plates are thermally connected to second radiating element 106*b* only. Similarly the first sections 306*c* of the second set of thermally conductive plates are thermally connected to a third radiating element 106*c* only, and the second sections 306*d* of the second set of thermally conductive plates are thermally connected to fourth radiating element 106*d* only. Therefore, four separate electrically and thermally conductive paths are made through the connections of the thermally conductive plates 306 and the radiating elements 106.

Such an arrangement, along with the gaps 702 between each of the sections of a given thermally conductive plate, means that the sections of the thermally conductive plates are not electrically connected. If the sections of the thermally conductive plates were electrically connected so as to form a complete turn around the winding assembly, the thermally conductive plates would act like a shorted turn. In other words, a high current would flow through them which could cause a failure of the primary function of the device. The gaps 702 are made large enough to prevent a low resistance electrical path from being formed, but not so large as to unnecessarily reduce the thermal contact area between the thermally conductive plates and the set of turns in each of the coils. For example, in some preferred embodiments the gaps may be at least about 10 mm wide within manufacturing and/or measurement tolerances.

The above described arrangement of thermally conductive plates may be used with each of the winding variants discussed in relation to FIGS. 5 to 10, with the appropriate modifications being made. Many other variations of the described thermally conductive plates could be used, as would be understood by the skilled person.

For example, in a preferred embodiment where each thermally conductive plate is separated into two sections, the sections may be symmetrical about the winding axis of the respective coil, as is the case in the preferred embodiment of FIGS. 3 and 4. However, in an alternative preferred embodiment, the two sections of the thermally conductive plates may by asymmetric. One section of the thermally conductive plate could extend further around the set of turns of the respective coil than the other section of that thermally conductive plate. For example, one of the sections of the thermally conductive plate could be U-shaped and the other section could be I-shaped. A symmetrical configuration, such as that shown in FIGS. 3 and 4 with two U-shaped thermally conductive plates, provides the most effective construction, as each thermally conductive plate will transfer an equal share of the generated heat. In the case of an asymmetrical U-shaped and I-shaped configuration, the U-shaped plate will have to transfer heat along a longer distance and also have to transfer a larger amount, which results in a larger thermal gradient compared to the symmetrical case.

The described preferred embodiment includes each thermally conductive plate being partitioned into two sections. However, in some preferred embodiments, each thermally conductive plate could be partitioned into more than two different sections, with each section attached to a different radiating element to facilitate heat removal. Alternatively, in some preferred embodiments each thermally conductive plate could include only one section. In this case the single section thermally conductive plates could all be arranged on one side of the device, or instead arranged with the thermally conductive plates corresponding to each coil on opposite sides of the device. Various other arrangements are possible, as would be understood by the skilled person.

In the case of the thermally conductive plates including a single section only, the thermally conductive plate may extend further round the outer sets of turns than the U-shaped sections of FIGS. 3 and 4. The single section thermally conductive plates may include an elongate portion which extends around the entire contour of each of the outer set of turns, apart from inclusion of a gap portion to prevent the thermally conductive plate from forming a complete turn, analogous to the gap portions 702 of FIG. 11. For example, in the case of square shaped turns, one C-shaped thermally conductive plate could be placed adjacent to each of the sets of turns of the first and second coil. However, as outlined above, a symmetrical configuration with two sections is more effective due to the lower thermal gradients.

In the preferred embodiment of FIGS. 3 and 4, the number of thermally conductive plates in the first set of thermally conductive plates 306*a*, 306*b* is equal to the number of sets of turns 302" in the first coil with the first diameter, and each of the sets of turns in the first coil with the first diameter has one adjacently disposed thermally conductive plate. Similarly, the number of thermally conductive plates in the second set of thermally conductive plates 306*c*, 306*d* is equal to the number of sets of turns 304" in the second coil with the first diameter, and each of the sets of turns in the second coil with the first diameter has one adjacently disposed thermally conductive plate. This one-to-one mapping between the thermally conductive plates and the sets of turns of the first and second coils with the first diameter means heat can be removed from each outer set of turns of each coil, preventing any given set of turns from overheating. However, in some preferred embodiments there may be less thermally conductive plates in each set than the number of sets of turns in each coil. For example, in one preferred embodiment, only every other outer set of turns of a given coil may have a thermally conductive plate disposed adjacent to it. In the case of the alternative helical winding arrangement discussed previously, which does not include an inner sets of turns in the first and second coils, there may be a one-to-one mapping between the number of sets of turns and the thermally conductive plates.

Although in the preferred embodiment of FIGS. 3 and 4, the first and second sets of thermally conductive plates have the same configuration, in some preferred embodiments, the configuration of the first and second sets of thermally conductive plates may be different. For example, the first and second sets of thermally conductive plates may include different arrangements of strip-like portions such that the thermally conductive plates have different shapes. Alternatively, the thermally conductive plates of the first and second sets could be partitioned into a different number of sections. The configuration of the thermal conductive plates could also vary within each of the sets of thermally conductive plates.

Returning to the preferred embodiment of FIGS. 3 and 4, the plates of the first set of thermally conductive plates 306*a*, 306*b* are disposed closer to the first coil 302 than to the second coil 304 along a coil winding axis, and the plates of the second set of thermally conductive plates 306*c*, 306*d* are disposed closer to the second coil 304 than to the first coil 302 along a coil winding axis. This will be discussed in more detail in FIG. 12 below.

Figure 12:
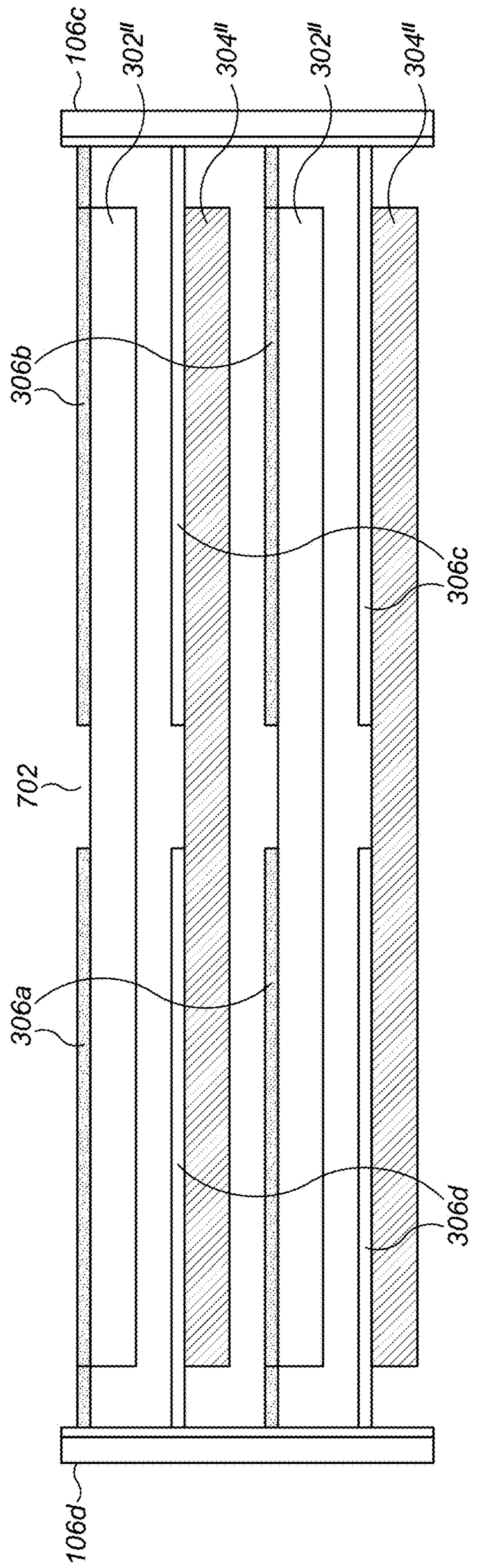
FIG. 12 shows a side view of FIG. 3.

FIG. 12 shows a side view of FIG. 3 from the direction marked A in FIG. 3. As with FIG. 3, the details of interconnections and input and output terminals of the coils are omitted in FIG. 12 for simplicity. In FIG. 12, the first and second coils 302, 304 have different shading patterns, and the first and second set of thermally conductive plates have different shading patterns. As can be seen from FIG. 12, the first coil, the second coil, and the first and second sets of thermally conductive plates are stacked in a laminar configuration. A laminar configuration allows the winding assembly to be more compact and easier to manufacture. The plates of the first set of thermally conductive plates 306*a*, 306*b* are positioned immediately adjacent to the first coil 302, in thermal contact with the first coil. The first set of thermally conductive plates may be in physical contact with the first coil, with the wires of the first coil including an electrically insulating layer to prevent electrical contact between the first set of thermally conductive plates and the first coil. This insulating layer may be an insulating coating on the wires, Kapton® tape or the like wrapped around the wires, or a thin layer of the resin dielectric between the wires of the first coil and the first set of thermally conductive plates. Similarly, the second set of thermally conductive plates 306*c*, 306*d* are positioned immediately adjacent to the second coil 304, in thermal contact with the second coil. Similar insulation arrangements can be used between the second set of thermally conductive plates 306*c*, 306*d* and the second coil 304.

When fully constructed, the first coil 302, the second coil 304, and the first and second sets of thermally conductive plates 306 are encased in the resin dielectric material. The first set of thermally conductive plates 306*a*, 306*b* are spatially separated from the second coil 304 such that, when the winding assembly is encased in the cast resin, a thick layer of resin dielectric material will fill the space between the first set of thermally conductive plates and the second coil to fulfil the isolation requirements between the first and second coils. Similarly, the second set of thermally conductive plates 306*c*, 306*d* are spatially separated from the first coil 302 such that, when the winding unit is encased in the cast resin, a thick layer of resin dielectric material will fill the space between the second set of thermally conductive plates and the first coil to fulfil the isolation requirements between the first and second coils. The resin layer between the first and second coils is typically a minimum of about 3 mm thick within manufacturing and/or measurement tolerances.

The plates of each set of thermally conductive plates are positioned close to one of the coils in order to maximize removal of heat from the windings. The resin material between each plate and the other winding provides the required electrical isolation between the first coil 302 and the second coil 304. Ensuring each plate is only positioned in direct proximity with one winding helps prevent the possibility of a short between the two windings through the thermally conductive plate.

As discussed above, high isolation requirements are desired in transformers such as HPHF transformers. Here, the cast resin provides the dielectric insulation between the windings. Each of the thermally conductive plates are positioned close to one of the coils to remove heat from that coil, and the cast resin between each of the thermally conductive plates and the other coil provides the desired isolation strength. In the case of a winding arrangement with inner and outer sets of turns, the cast resin will also provide insulation between the inner sets of turns.

Once the cast resin process is complete the winding assembly of this preferred embodiment will look as shown in FIG. 2. The cast resin material in this preferred embodiment forms a square shaped loop; however, other shapes are possible. For example, the cast resin could be shaped as a circular torus if the first and second coils were circular. As shown in FIG. 2, the cooling structure, in this case the radiating elements 106, are located outside of the resin dielectric material. In this preferred embodiment, the radiating elements 106 are mounted on the surface of the cast resin material. The radiating elements 106 are attached to the thermally conductive plates 306 via connection portions 402 which extend outside the encasing cast resin dielectric material. Radiating elements 106 mounted on the outside of the cast resin dielectric material allows the heat transferred to the thermally conductive plates from the windings to be removed via radiation and convention. Thus, a cast resin dielectric can be used to provide the isolation requirements without causing overheating in device with high loss densities. The preferred embodiments of the present invention allow the required distance of insulation to be maintained all the way out to the radiation surfaces. Therefore, this approach makes it possible to extract the heat out of the windings without degrading the isolation properties of the transformer. An airflow over the radiating elements could be used to increase removal of heat.

Other known cooling structures could be used in place of the radiating elements 106. For example, other examples of radiating elements could be used, or the thermally conductive plates could instead be attached to a cooling plate or the like to remove the heat extracted from the interior of the winding assembly 104.

The input and output terminals of the first and second coils (not shown in FIG. 2) may also extend outside of the resin dielectric material, to allow an electrical signal to be input or output from the first and second coils. Alternatively, connection terminals could be located on the outer surface of the cast resin material.

Figure 13:
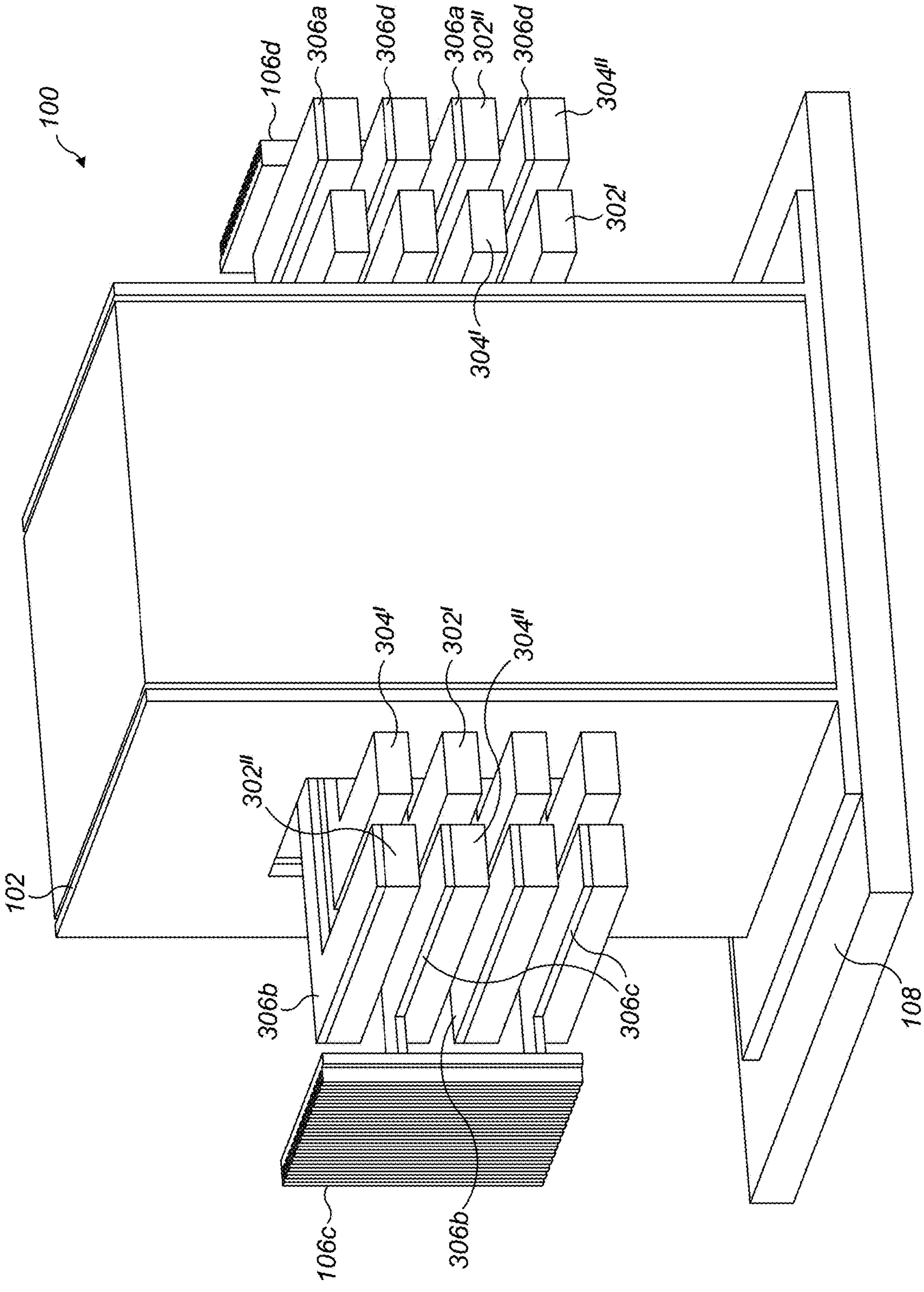
FIG. 13 shows a cross section of the transformer device of FIG. 1 with the cast resin omitted.
Figure 14:
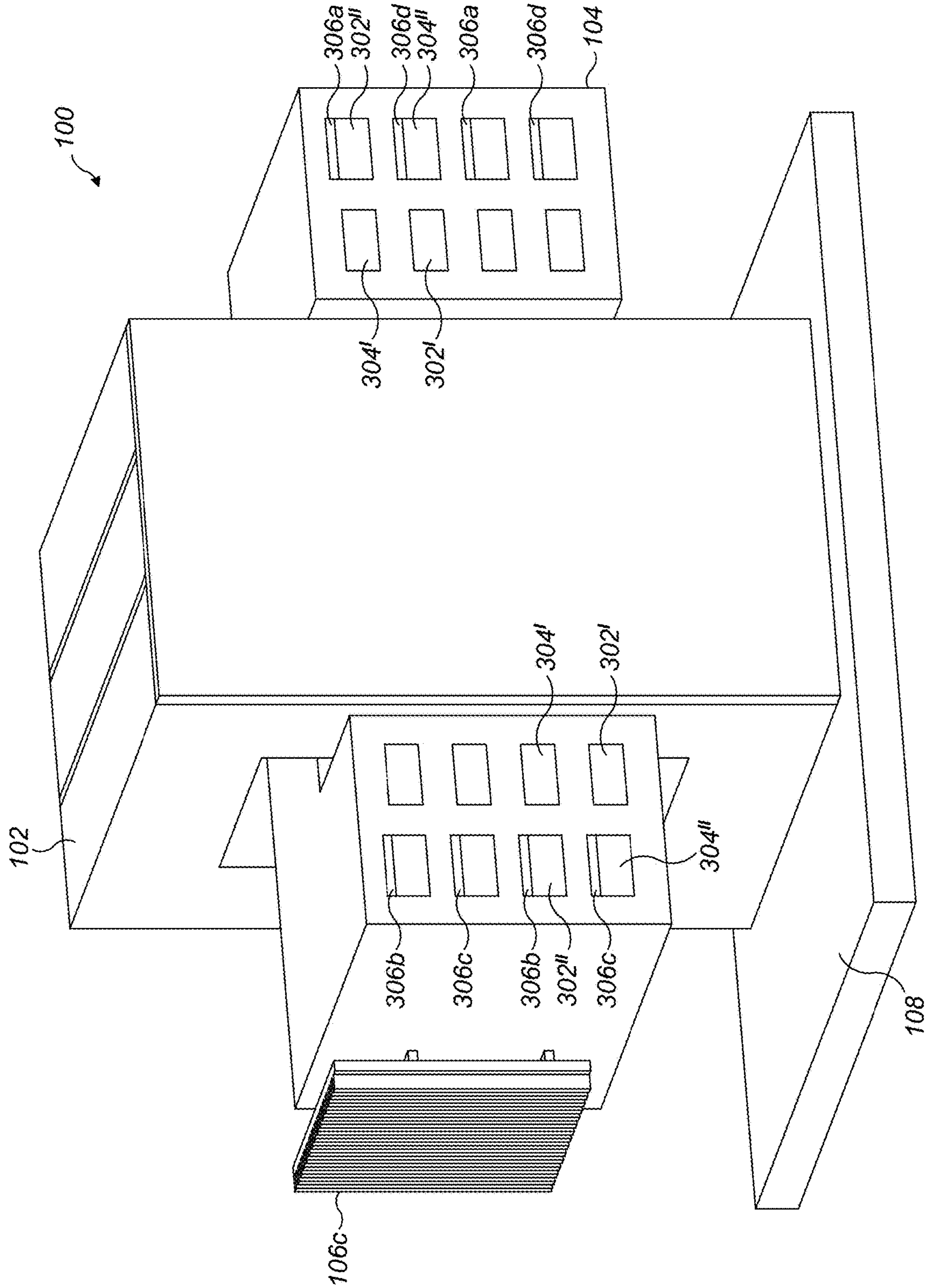
FIG. 14 shows a cross section of the transformer device of FIG. 1.

FIGS. 13 and 14 show a cross section through the completed transformer device 100 of FIG. 1 without the cast resin in FIG. 13 and with the cast resin in FIG. 14. Again, details of interconnections and input and output terminals have been omitted for simplicity. The winding assembly 104 could be used in various other types of transformer devices.

A number of variations to the described preferred embodiments could be made, as would be understood by the skilled person. For example, various winding arrangements could be used, provided each electrical circuit formed by the thermally conductive plates and corresponding radiating elements is in close proximity with only one of the coils, and is isolated from the other coil by a gap filed with cast resin material. Possible winding arrangements include Murata's pdqb type windings with one or more inner and outer sets of turns, or a double helix type arrangement with a first and second coil. In one preferred embodiment, each of the thermally conductive plates may be placed against a single turn of one of the coils, rather than against sets of turns of each coil.

Other variations include the use of alternative coil shapes, such as circular coils instead of square coils. The shape of the thermally conductive plates can be altered so as to follow to the paths of the windings. Also, round wire windings could be used instead of flat wire windings. In this case, the thermally conductive plates could have a concave, half-cylinder shape so as to increase the contact area with the round wire windings.

The winding axes of the first and second coils are typically the same to make the device more compact and simplify the construction of the device. However, preferred embodiments of the invention are not limited to such an arrangement. The concept can be extended to any winding arrangement where both the input and output windings are encased in cast resin as a single unit, with the cast resin providing isolation between the windings. Winding arrangements where both the input and output windings are cast a single unit, for example, Murata's pdqb windings, are used to maintain the minimum separation between the windings in order to mitigate high frequency losses due to the proximity effect.

The preferred embodiments of the claimed invention allow cast resin to be used to provide the isolation requirements in transformers where cast resin cannot typically be used due to thermal considerations. The thermally conductive plates allow heat to be removed from the windings while they are encased in the cast resin, preventing damage or failure due to overheating. Use of cast resin physically protects the windings, as well as removing the expense and complexity of a coolant circulation system. The preferred embodiments of the claimed invention facilitate efficient removal of heat generated in the windings in without degrading the dielectric isolation strength between the input and output windings. This opens up the possibility of achieving very high isolation levels between the windings of high frequency transformers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A winding assembly for a transformer comprising:

a first coil and a second coil, each including a plurality of sets of turns, wherein each of the plurality of set of turns includes one or more individual turns;

a first set and a second set of thermally conductive plates; and a resin dielectric material; wherein the plurality of sets of turns of the first coil are interleaved with the plurality of sets of turns of the second coil;

the first set of thermally conductive plates is interleaved with the plurality of sets of turns of the first coil, with each plate of the first set of thermally conductive plates disposed adjacent to one of the plurality of sets of turns of the first coil, to transfer heat away from the first coil;

the second set of thermally conductive plates is interleaved with the plurality of sets of turns of the second coil, with each plate of the second set of thermally conductive plates disposed adjacent to one of the plurality of sets of turns of the second coil, to transfer heat away from the second coil;

the first coil, the second coil, and the first and the second sets of thermally conductive plates are encased in the resin dielectric material to electrically insulate the first coil and the second coil.

2. The winding assembly of claim 1, wherein:

each plate of the first set of thermally conductive plates is disposed closer to the first coil than to the second coil along a coil winding axis; and each plate of the second set of thermally conductive plates is disposed closer to the second coil than to the first coil along a coil winding axis.

3. The winding assembly of claim 1, wherein:

each plate of the first set of thermally conductive plates includes one or more elongate portions that are arranged to follow the turns of the first coil and includes one or more gap portions such that the plate does not define a complete turn; and each plate of the second set of thermally conductive plates includes one or more elongate portions that are arranged to follow the turns of the second coil and includes one or more gap portions such that the plate does not define a complete turn.

4. The winding assembly of claim 3, wherein each plate of the first and the second sets of thermally conductive plates is split into two sections electrically isolated from each other, with the gap portions separating the two sections.

5. The winding assembly of claim 4, wherein the two sections of each plate of the first second set of thermally conductive plates are symmetrical when viewed along the coil winding axis of the first coil and are each arranged to follow a half turn of the first coil; and the two sections of each plate of the second set of thermally conductive plates are symmetrical when viewed along the coil winding axis of the second coil and are each arranged to follow a half turn of the second coil.

6. The winding assembly of claim 4, wherein:

each plate of the first and second sets of thermally conductive plates is thermally connected to a cooling structure;

plates of the first set of thermally conductive plates are thermally connected to a different cooling structure than plates of the second set of thermally conductive plates to prevent electrical contact between the first and the second sets of thermally conductive plates; and the two sections of each plate are thermally connected to different cooling structures to prevent electrical connection between the two sections of each plate.

7. The winding assembly of claim 1, wherein each plate of the first and the second sets of thermally conductive plates includes layers with one or more thermally conductive strip-like portions.

8. The winding assembly of claim 7, wherein:

the first and the second coils include a plurality of layers with one or more electrically conductive strip-like portions; and the one or more thermally conductive strip-like portions of each plate of the first and the second sets thermally conductive plates at least partially overlap the one or more electrically conductive strip-like portions of the first and second coils.

9. The winding assembly of claim 7, wherein the one or more thermally conductive strip-like portions of each plate of the first and the second sets thermally conductive plates are arranged such that each plate is C-shaped or U-shaped.

10. The winding assembly of claim 1, wherein:

a number of plates in the first set of thermally conductive plates is equal to a number of sets of turns in the first coil, and each of the plurality of sets of turns in the first coil has one adjacently disposed thermally conductive plate; and a number of plates in the second set of thermally conductive plates is equal to a number of sets of turns in the second coil, and each of the plurality of sets of turns in the second coil has one adjacently disposed thermally conductive plate.

11. The winding assembly of claim 1, wherein:

each plate of the first and the second sets of thermally conductive plates is thermally connected to a cooling structure; and plates of the first set of thermally conductive plates are thermally connected to a different cooling structure than plates of the second set of thermally conductive plates to prevent electrical contact between the two sets of thermally conductive plates.

12. The winding assembly of claim 11, wherein the cooling structures are radiating elements that are located outside of the resin dielectric material and that are attached to the plates via connections which extend outside the encasing resin dielectric material.

13. The winding assembly of claim 1, wherein:

the plurality of sets of turns of both the first and the second coil have first and second diameters;

the first diameter is larger than the second diameter;

each of the first set of thermally conductive plates is disposed adjacent to the plurality of sets of turns of the first coil which have the first diameter; and each of the second set of thermally conductive plates is disposed adjacent to the plurality of sets of turns of the second coil which have the first diameter.

14. The winding assembly of claim 13 wherein:

the plurality of sets of turns of the first coil alternate between having the first diameter and the second diameter; and the plurality of sets of turns of the second coil alternate between having the second diameter and the first diameter.

15. The winding assembly of claim 13 wherein:

the number of thermally conductive plates in the first set of thermally conductive plates is equal to a number of the plurality of sets of turns in the first coil with the first diameter, and each of the plurality of sets of turns in the first coil with the first diameter has one adjacently disposed thermally conductive plate; and the number of thermally conductive plates in the second set of thermally conductive plates is equal to a number of the plurality of sets of turns in the second coil with the first diameter, and each of the plurality of sets of turns in the second coil with the first diameter has one adjacently disposed thermally conductive plate.

16. The winding assembly of claim 13 wherein:

interconnections in the first coil between the plurality of sets of turns with the first diameter and the plurality of sets of turns with the second diameter fit around the thermally conductive plates; and interconnections in the second coil between the plurality of sets of turns with the first diameter and the plurality of sets of turns with the second diameter fit around the thermally conductive plates.

17. The winding assembly of claim 1, wherein:

the plurality of sets of turns of the first and the second coils are square shaped;

each plate of the first sets of thermally conductive plates is U-shaped to follow the plurality of sets of turns of the first coil; and each plate of the second sets of thermally conductive plates is U-shaped to follow the plurality of sets of turns of the second coil.

18. The winding assembly of claim 1, wherein the first coil, the second coil, and the first and the second sets of thermally conductive plates are stacked in a laminar configuration.

19. The winding assembly of claim 1, wherein the first and the second coils share a common winding axis.

20. A transformer device comprising:

a transformer core; and the winding assembly of claim 1.

* * * * *